US011011137B2

(12) United States Patent
Higashiyama et al.

(10) Patent No.: US 11,011,137 B2
(45) Date of Patent: May 18, 2021

(54) DISPLAY DEVICE, DISPLAY CONTROL METHOD, AND STORAGE MEDIUM FOR REDUCING VISIBILITY OF DOUBLE-IMAGES IN HEAD-UP DISPLAYS

(71) Applicant: HONDA MOTOR CO., LTD., Tokyo (JP)

(72) Inventors: Masafumi Higashiyama, Wako (JP); Takuya Kimura, Wako (JP); Shinji Kawakami, Wako (JP); Tatsuya Iwasa, Wako (JP); Yuji Kuwashima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/581,908

(22) Filed: Sep. 25, 2019

(65) Prior Publication Data
US 2020/0105224 A1    Apr. 2, 2020

(30) Foreign Application Priority Data
Oct. 1, 2018 (JP) .............. JP2018-186771

(51) Int. Cl.
*G09G 5/10* (2006.01)
*H04N 9/31* (2006.01)
(Continued)

(52) U.S. Cl.
CPC .............. *G09G 5/10* (2013.01); *B60K 35/00* (2013.01); *G02B 27/0101* (2013.01);
(Continued)

(58) Field of Classification Search
CPC ............. G09G 5/10; G09G 2320/0626; G09G 2380/10; B60K 35/00; B60K 2370/1529;
(Continued)

(56) References Cited

U.S. PATENT DOCUMENTS

| 4,787,711 A * | 11/1988 | Suzuki | G02B 27/0101 359/631 |
| 2013/0271737 A1* | 10/2013 | Park | G02B 13/24 353/98 |
| 2019/0235240 A1* | 8/2019 | Nagano | B60K 35/00 |

FOREIGN PATENT DOCUMENTS

| JP | 11-119147 | 4/1999 |
| JP | 2016-088168 | 5/2016 |

(Continued)

OTHER PUBLICATIONS

Japanese Office Action for Japanese Patent Application No. 2018-186771 dated May 19, 2020.

*Primary Examiner* — Wing H Chow
(74) *Attorney, Agent, or Firm* — Amin, Turocy & Watson, LLP

(57) ABSTRACT

A display device includes a light projection device which projects light including an image onto a reflector reflecting incident light to allow an observer to visually recognize the image included in the light reflected by the reflector as a virtual image, and a control device which causes the light projection device to output first light including a first image in a first case where a surrounding brightness is equal to or greater than a threshold value and causes the light projection device to output second light including a second image in a second case where the surrounding brightness is less than the threshold value.

10 Claims, 10 Drawing Sheets

(51) Int. Cl.
  *G02B 27/01* (2006.01)
  *B60K 35/00* (2006.01)
(52) U.S. Cl.
  CPC ... *H04N 9/3155* (2013.01); *B60K 2370/1529* (2019.05); *B60K 2370/349* (2019.05); *G02B 2027/0118* (2013.01); *G09G 2320/0626* (2013.01); *G09G 2380/10* (2013.01)
(58) Field of Classification Search
  CPC .......... B60K 2370/349; G02B 27/0101; G02B 2027/0118; H04N 9/3155
  See application file for complete search history.

(56) References Cited

FOREIGN PATENT DOCUMENTS

| | | |
|---|---|---|
| JP | 2017-091115 | 5/2017 |
| JP | 2018-025600 | 2/2018 |

* cited by examiner

DISPLAY DEVICE, DISPLAY CONTROL METHOD, AND STORAGE MEDIUM FOR REDUCING VISIBILITY OF DOUBLE-IMAGES IN HEAD-UP DISPLAYS

CROSS-REFERENCE TO RELATED APPLICATION

This application is based upon and claims the benefit of priority from Japanese Patent Application No. 2018-186771, filed Oct. 1, 2018, the entire content of which is incorporated herein by reference.

BACKGROUND

Field of the Invention

The present invention relates to a display device, a display control method, and a storage medium.

Description of Related Art

In the related art, head-up display devices (hereinafter referred to as head up display (HUD) devices) that display images related to basic information for drivers on front windshields have become known (see, for example, Japanese Unexamined Patent Application, First Publication No. 2017-91115). Various marks indicating obstacles, alerts, and moving directions are displayed at predetermined positions on front windshields superimposed on scenes in front of vehicles by using such HUD devices, so that drivers can understand the various displayed information while keeping their line of sight forward while driving.

SUMMARY

However, in the related art, light is projected onto a light-transmissive object such as a front windshield in order to display an image superimposed on a scene, and thus a phenomenon called a double image in which two images having different luminances overlap each other occurs, which may result in a reduction in the visibility of an image.

One object of aspects of the present invention is to provide a display device, a display control method, and a storage medium which are capable of improving the visibility of an image.

A display device, a display control method, and a storage medium according to the present invention adopt the following configurations.

(1) A display device according to an aspect of the present invention includes a light projection device which projects light including an image onto a reflector reflecting incident light to allow an observer to visually recognize the image included in the light reflected by the reflector as a virtual image, and a control device which causes the light projection device to output first light including a first image in a first case where a surrounding brightness is equal to or greater than a threshold value and causes the light projection device to output second light including a second image in a second case where the surrounding brightness is less than the threshold value.

In the aspect of (2) according to the aspect of (1), the control device may switch an image included in light to be output by the light projection device to the first image or the second image on the basis of a luminance of the image and a surrounding brightness.

In the aspect of (3) according to the aspect of (1) or (2), the control device may cause the light projection device to output the second light including the second image having more content than the first image.

In the aspect of (4) according to any one of the aspects of (1) to (3), the control device may cause the light projection device to output the first light including the first image in which an object is disposed above content.

In the aspect of (5) according to any one of the aspects of (1) to (3), the control device may cause the light projection device to output the first light including the first image in which an object is disposed below content.

In the aspect of (6) according to any one of the aspects of (1) to (5), the control device may cause the light projection device to output the first light including the first image in which an object surrounding content is disposed.

In the aspect of (7) according to any one of the aspects of (4) to (6), the control device may cause the light projection device to output the first light including the first image in which the object in the blue color is disposed.

In the aspect of (8) according to the aspect of (7), the control device may cause the light projection device to output the first light including the first image in which the object in the blue color is disposed to have a mixing ratio of the three primary colors in which red has a range of 37 to 79, green has a range of 72 to 129, and blue has a range of 114 to 189.

In the aspect of (9) according to any one of the aspects of (1) to (8), the light projection device may include a display that emits light including an image, an optical mechanism which is provided on a path of the light and is capable of adjusting an optical distance from a predetermined position to a position where the light is formed as a virtual image, a concave mirror which reflects light having passed through the optical mechanism toward the reflector, a first actuator which adjusts the optical distance, and a second actuator which adjusts a reflection angle of the concave mirror, and the control device changes the optical distance by controlling the first actuator and may change the reflection angle by controlling the second actuator.

In the aspect of (10) according to the aspect of (9), the optical mechanism may include one or more lenses, and the first actuator may adjust the optical distance by moving positions of the lenses in an optical axis direction of the light.

In the aspect of (11) according to the aspect of (9) or (10), the control device may further change a size of the image in accordance with the optical distance by controlling the display.

(12) A display control method according to another aspect of the present invention includes causing a computer to cause a light projection device to output first light including a first image in a first case where a surrounding brightness is equal to or greater than a threshold value and to cause the light projection device to output second light including a second image in a second case where the surrounding brightness is less than the threshold value, the computer including the light projection device which projects light including an image onto a reflector reflecting incident light to allow an observer to visually recognize the image included in the light reflected by the reflector as a virtual image.

(13) A computer-readable non-transitory storage medium according to still another aspect of the present invention stores a program for causing a computer to cause a light projection device to output first light including a first image in a first case where a surrounding brightness is equal to or greater than a threshold value and to cause the light projection device to output second light including a second image in a second case where the surrounding brightness is less than the threshold value, the computer including the light projection device which projects light including an image onto a reflector reflecting incident light to allow an observer to visually recognize the image included in the light reflected by the reflector as a virtual image.

According to the aspects of (1) to (13), it is possible to improve the visibility of an image.

DESCRIPTION OF EMBODIMENTS

Hereinafter, embodiments of a display device, a display control method, and a storage medium of the present invention will be described with reference to the accompanying drawings. The display device is a device which is mounted on, for example, a vehicle (hereinafter, referred to as a vehicle M) and makes a person visually recognize an image by superimposing the image on a scene. The display device is, for example, an HUD device. As an example, the display device is a device that makes an observer visually recognize a virtual image by projecting light including an image onto a front windshield of the vehicle M. The observer is, for example, a driver of the vehicle M. The present invention is not limited thereto, and the display device may make an occupant (for example, an occupant sitting on a seat next to a driver, or the like) other than a driver visually recognize a virtual image.

In the following description, a positional relationship and the like will be appropriately described using an XYZ coordinate system. A Z-direction represents a vertical direction, an X-direction represents one direction of a horizontal surface orthogonal to the Z-direction, and a Y-direction represents the other direction of the horizontal surface. The Z-direction represents a height direction of the vehicle M, the X-direction represents a depth direction of the vehicle M, and the Y-direction represents a width direction of the vehicle M.

[Overall Configuration]

Figure 1:
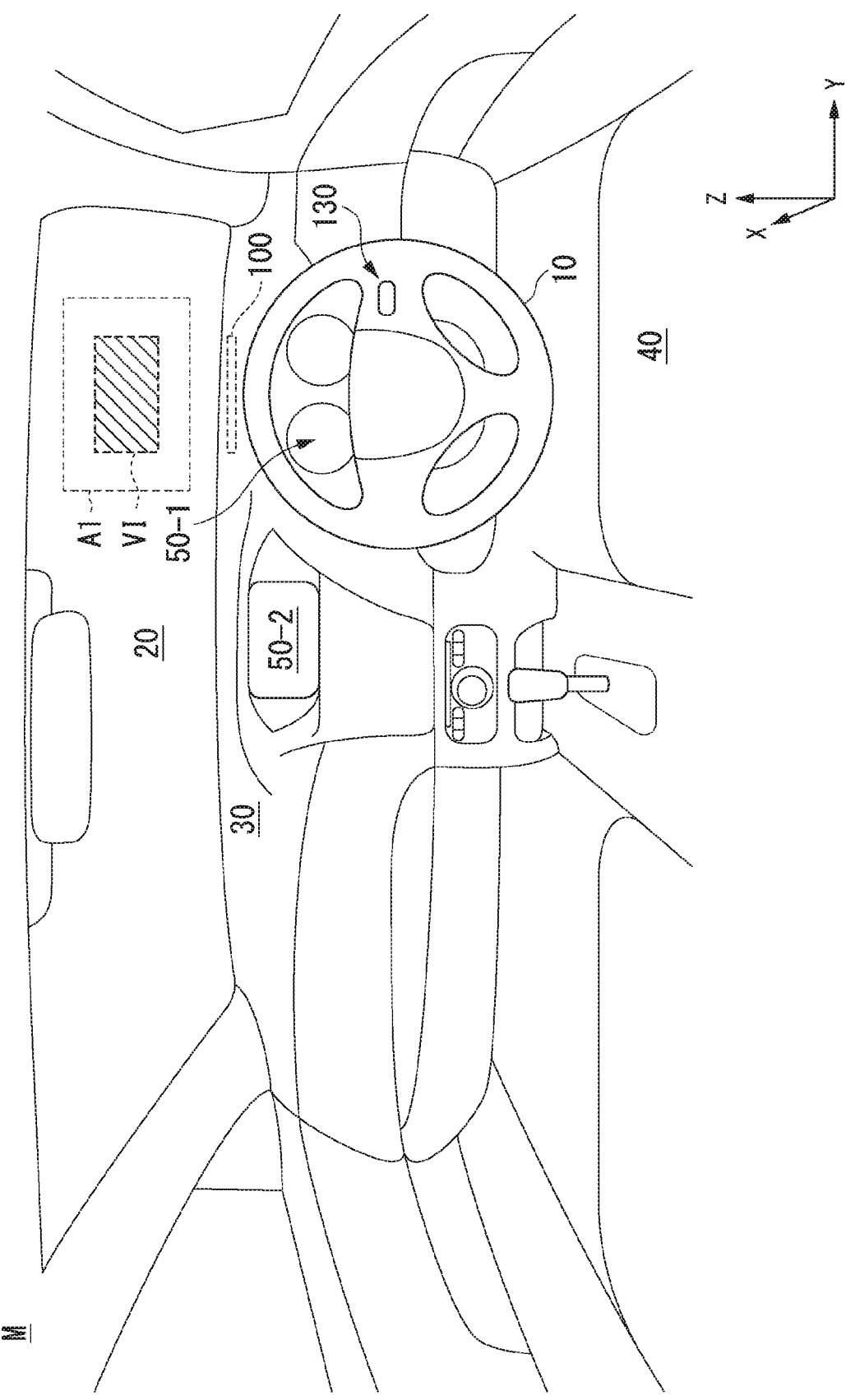
FIG. 1 is a diagram showing a configuration of the inside of a vehicle equipped with a display device according to an embodiment.

FIG. 1 is a diagram showing a configuration of the inside of the vehicle M on which a display device 100 according to the embodiment is mounted. The vehicle M is provided with, for example, a steering wheel 10 that controls the steering of the vehicle M, a front windshield 20 that divides the vehicle into the outside and the inside, and an instrument panel 30. The front windshield 20 is a member having light transmittance. For example, the display device 100 makes a driver sitting on a driver's seat 40 visually recognize a virtual image VI by projecting light including an image onto a partial region (hereinafter, referred to as a displayable region A1) of the front windshield 20 in front of the driver's seat 40.

For example, the display device 100 makes the driver visually recognize information for supporting the driver's driving as the virtual image VI. The information for supporting the driver's driving includes information such as the speed of the vehicle M, a driving force distribution ratio, an engine speed, operation states of driving support functions, shift positions, sign recognition results, and intersection positions. The driving support functions include, for example, an adaptive cruise control (ACC), a lane keep assist system (LKAS), a collision mitigation brake system (CMBS), a traffic jam assist function, and the like.

In addition, the vehicle M may be provided with a second display device 50-1 and a third display device 50-2 in addition to the display device 100. For example, the second display device 50-1 is a display device provided in the vicinity of the front of the driver's seat 40 in the instrument panel 30 and visually recognizable by the driver through a gap in the steering wheel 10 or over the steering wheel 10. In addition, the third display device 50-2 is attached to, for example, the central portion of the instrument panel 30. The third display device 50-2 displays, for example, an image corresponding to a navigation process executed by a navigation device (not shown) mounted on the vehicle M, a video of a counterpart in a video phone, and the like. In addition, the third display device 50-2 may display a television program, reproduce a DVD, or display content such as a downloaded movie.

In addition, the vehicle M is provided with an operation switch 130 that receives an instruction for switching turn-on/turn-off of display performed by the display device 100 and an instruction for adjusting the position of the virtual image VI. The operation switch 130 is attached to, for example, a position where the driver sitting on the driver's seat 40 can operate the operation switch without changing his or her posture much. For example, the operation switch 130 may be provided in front of the second display device 50-1, may be provided in a protrusion (projection) portion of the instrument panel 30 provided with the steering wheel 10, or may be provided at a spoke connecting the steering wheel 10 and the instrument panel 30 to each other.

Figure 2:
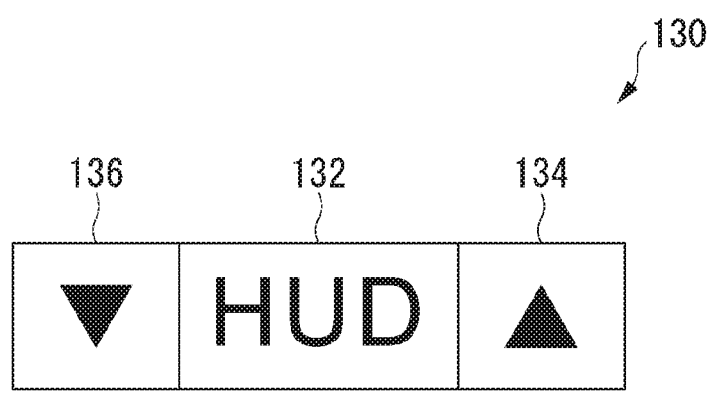
FIG. 2 is a diagram showing an operation switch of the embodiment.

FIG. 2 is a diagram showing the operation switch 130 of the embodiment. The operation switch 130 includes, for example, a main switch 132, a first adjustment switch 134, and a second adjustment switch 136. The main switch 132 is a switch for switching turn-on/turn-off of the display device 100.

The first adjustment switch 134 is a switch for receiving an operation of moving the position of the virtual image VI to the upper side (hereinafter, referred to as upward) with respect to the vertical direction Z. The virtual image VI is, for example, a virtual image which is visually recognizable by the driver over the front windshield 20 onto which an image is projected in a state where the driver is sitting on the driver's seat 40. The virtual image VI is displayed in the displayable region A1 as if the virtual image is present in a space outside the vehicle which has passed through the front windshield 20 in a case where the driver views the displayable region A1 from a line-of-sight position P1 of the driver to be described later. The driver can continuously move a visual recognition position of the virtual image VI upward within the displayable region A1, for example, by continuously pressing the first adjustment switch 134.

The second adjustment switch 136 is a switch for receiving an operation of moving the position of the virtual image VI to the lower side (hereinafter, referred to as downward) with respect to the vertical direction Z. The driver can continuously move a visual recognition position of the virtual image VI downward within the displayable range A1 by continuously pressing the second adjustment switch 136.

In addition, the first adjustment switch 134 may be a switch that receives an operation for increasing the luminance of the virtual image VI instead of (or in addition to) moving the position of the virtual image VI upward. In addition, the second adjustment switch 136 may be a switch that receives an operation for decreasing the luminance of the visually recognized virtual image VI instead of (or in addition to) moving the position of the virtual image VI downward. Details (regarding a change in a position or a change in a luminance) of an instruction received by the first adjustment switch 134 and the second adjustment switch 136 may be switched on the basis of any operation. Any operation is, for example, a long-pressing operation of the main switch 132. In addition, the operation switch 130 may separately include a switch that receives an operation for selecting display details and a switch that receives an operation for adjusting the luminance of the virtual image VI, in addition to the switches shown in FIG. 2.

Figure 3:
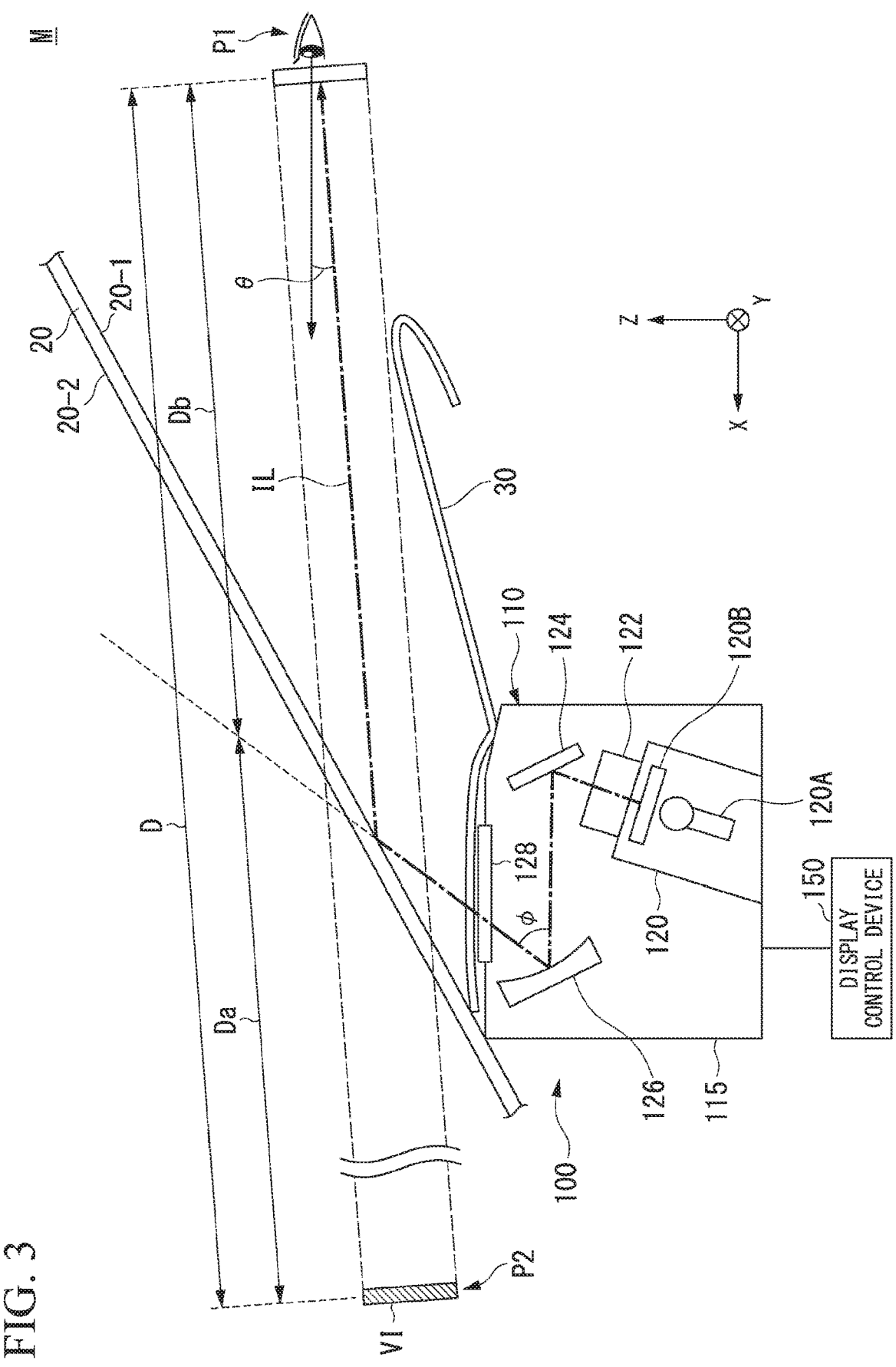
FIG. 3 is a partial configuration diagram of a display device.

FIG. 3 is a partial configuration diagram of the display device 100. The display device 100 includes, for example, a display 110 and a display control device 150. The display 110 accommodates, for example, a light projection device 120, an optical mechanism 122, a plane mirror 124, a concave mirror 126, and a light-transmitting cover 128 in a housing 115. In addition to these, the display device 100 includes various sensors and actuators, which will be described later.

The light projection device 120 includes, for example, a light source 120A and a display element 120B. The light source 120A is, for example, a cold-cathode tube or a light-emitting diode and outputs visible light corresponding to the virtual image VI which is visually recognized by the driver. The display element 120B controls the transmission of visible light from the light source 120A. The display element 120B is, for example, a thin-film transistor (TFT) type liquid crystal display device (LCD). In addition, the display element 120B controls each of a plurality of pixels to control the degree of transmission for each color element of visible light from the light source 120A, thereby including an image element in the virtual image VI and determining a display mode (appearance) of the virtual image VI. Hereinafter, visible light passing through the display element 120B and including an image will be referred to as image light IL. Meanwhile, the display element 120B may be an organic electro-luminescence (EL) display, and in this case, the light source 120A may be omitted. A combination of the light source 120A and the display element 120B is an example of a "display".

The optical mechanism 122 includes, for example, one or more lenses. For example, the position of each lens can be adjusted in an optical axis direction. For example, the optical mechanism 122, which is provided on a path of the image light IL output by the light projection device 120, transmits the image light IL incident from the light projection device 120 and emits the image light IL toward the front windshield 20. For example, the optical mechanism 122 can adjust a distance from a line-of-sight position P1 of the driver to a formation position (an image formation position where the image light IL is formed as the virtual image VI) P2 where the image light IL is formed as the virtual image VI by changing the position of the lens. Hereinafter, a description will be given by referring to the distance from the position P1 to the position P2 as a virtual image visible distance D. The line-of-sight position P1 of the driver is a position where light is reflected by the concave mirror 126 and the front windshield 20 and the image light IL is condensed, and is a position where it is assumed that the driver's eyes are present at this position. The virtual image visible distance D is strictly a distance of a segment having an inclination in a vertical direction. However, when an expression of "the virtual image visible distance D is 7 [m]" or the like is given in the following description, the distance may mean a distance in a horizontal direction.

The plane mirror 124 reflects visible light (that is, the image light IL) emitted by the light source 120A and having passed through the display element 120B toward the concave mirror 126.

The concave mirror 126 reflects the image light IL incident from the plane mirror 124 and emits the image light IL toward the front windshield 20. The concave mirror 126 is supported to be rotatable (revolvable) around the Y-axis, which is an axis in a width direction of the vehicle M.

The light-transmitting cover 128, which is a member having light transmittance, is formed of synthetic resins such as plastics. The light-transmitting cover 128 is provided to cover an opening formed in an upper surface of the housing 115. In addition, the instrument panel 30 is also provided with an opening or a member having light transmittance. Thereby, the image light IL reflected by the concave mirror 126 can pass through the light-transmitting cover 128 and can be incident on the front windshield 20, and the inflow of foreign substances such as dust, dirt, and water drops in the housing 115 is curbed.

The image light IL incident on the front windshield 20 is reflected by the front windshield 20 and is condensed on the line-of-sight position P1 of the driver. In this case, when the driver's eyes are positioned at the line-of-sight position P1 of the driver, the driver perceives as if an image projected by the image light IL is displayed in front of the vehicle M.

When the image light IL reflected by the concave mirror 126 is incident on the front windshield 20, the front windshield 20 having a certain thickness has light transmittance, and thus the image light IL is reflected from each of a front surface (a surface inside the vehicle) 20-1 of the front windshield 20 and a rear surface (a surface outside the vehicle) 20-2 thereof. In this case, a portion of the virtual image VI (hereinafter, referred to as a first virtual image $VI_1$) of the image light IL reflected by the front surface 20-1 of the front windshield 20 and a portion of the virtual image VI (hereinafter, referred to as a second virtual image $VI_2$) of the image light IL reflected by the rear surface 20-2 of the front windshield 20 overlap each other, and the first virtual image VI$_1$ and the second virtual image VI$_2$ may be visually recognized by the driver as a double image.

Figure 4:
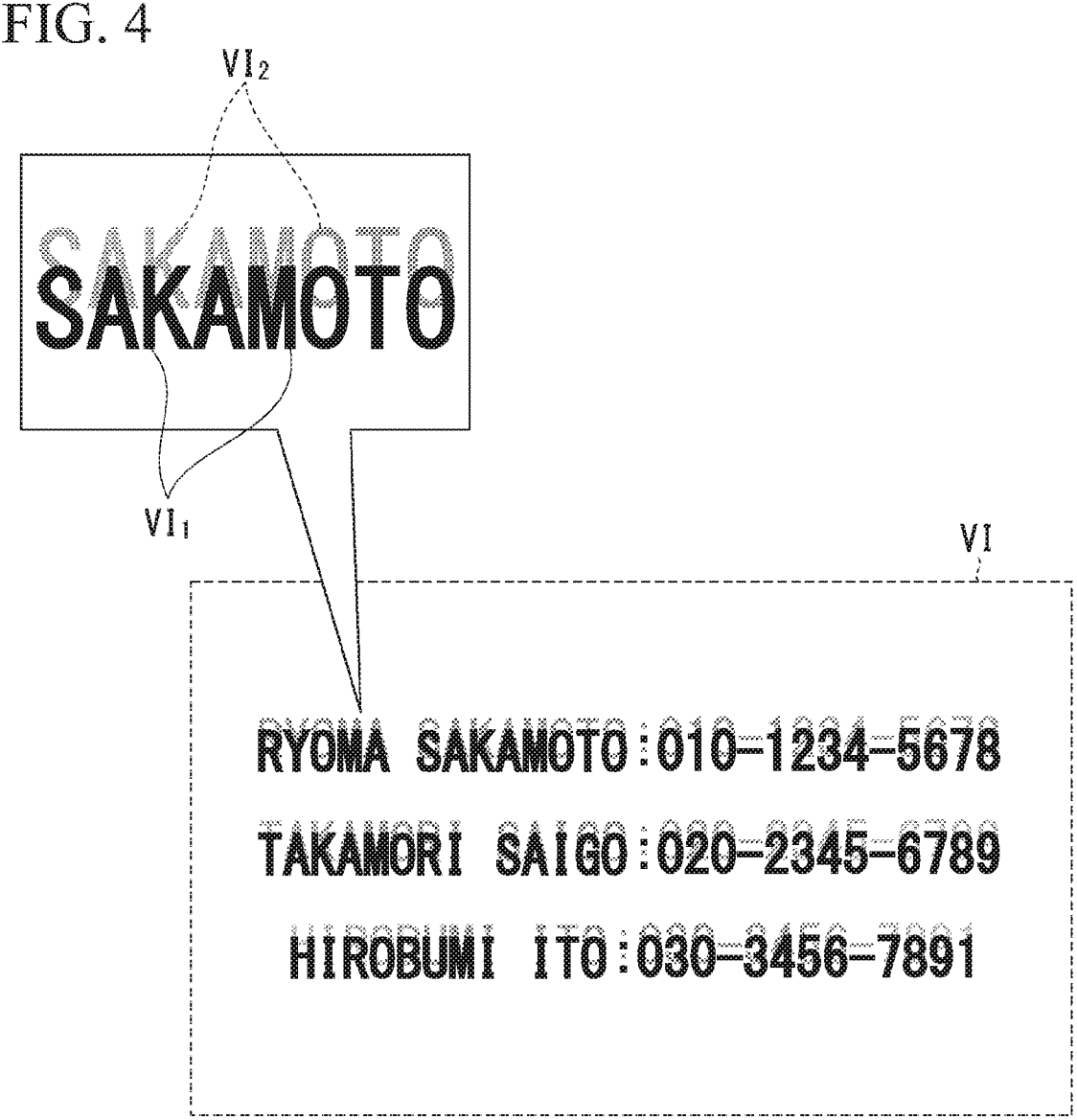
FIG. 4 is a diagram showing an example of a virtual image in which a double image is generated.

FIG. 4 is a diagram showing an example of the virtual image VI in which a double image is generated. As shown in the drawing, for example, in a case where an image including text and the like is output by the light projection device 120 as image light IL, the image light IL reflected by the front surface 20-1 of the front windshield 20 is condensed at the line-of-sight position P1 of the driver, so that the first virtual image VI$_1$ is formed, and the image light IL reflected by the rear surface 20-1 of the front windshield 20 is condensed at the line-of-sight position P1 of the driver, so that the second virtual image VI$_2$ is formed. As shown in FIG. 3, the image light IL reflected by the concave mirror 126 is incident on the front windshield 20 inclined in the horizontal direction (X-direction) from below, and thus a reflection point of the image light IL on the rear surface 20-2 of the front windshield 20 is positioned above a reflection point of the image light IL on the front surface 20-1. As a result, the second virtual image VI$_2$ is formed to shift above the first virtual image VI$_1$. The luminance of the second virtual image VI$_2$ becomes lower than that of the first virtual image VI$_1$ due to differences in air inside the vehicle and a refractive index of the front windshield 20. That is, the second virtual image VI$_2$ is displayed with a more transparent background than the first virtual image I$_1$.

Figure 5:
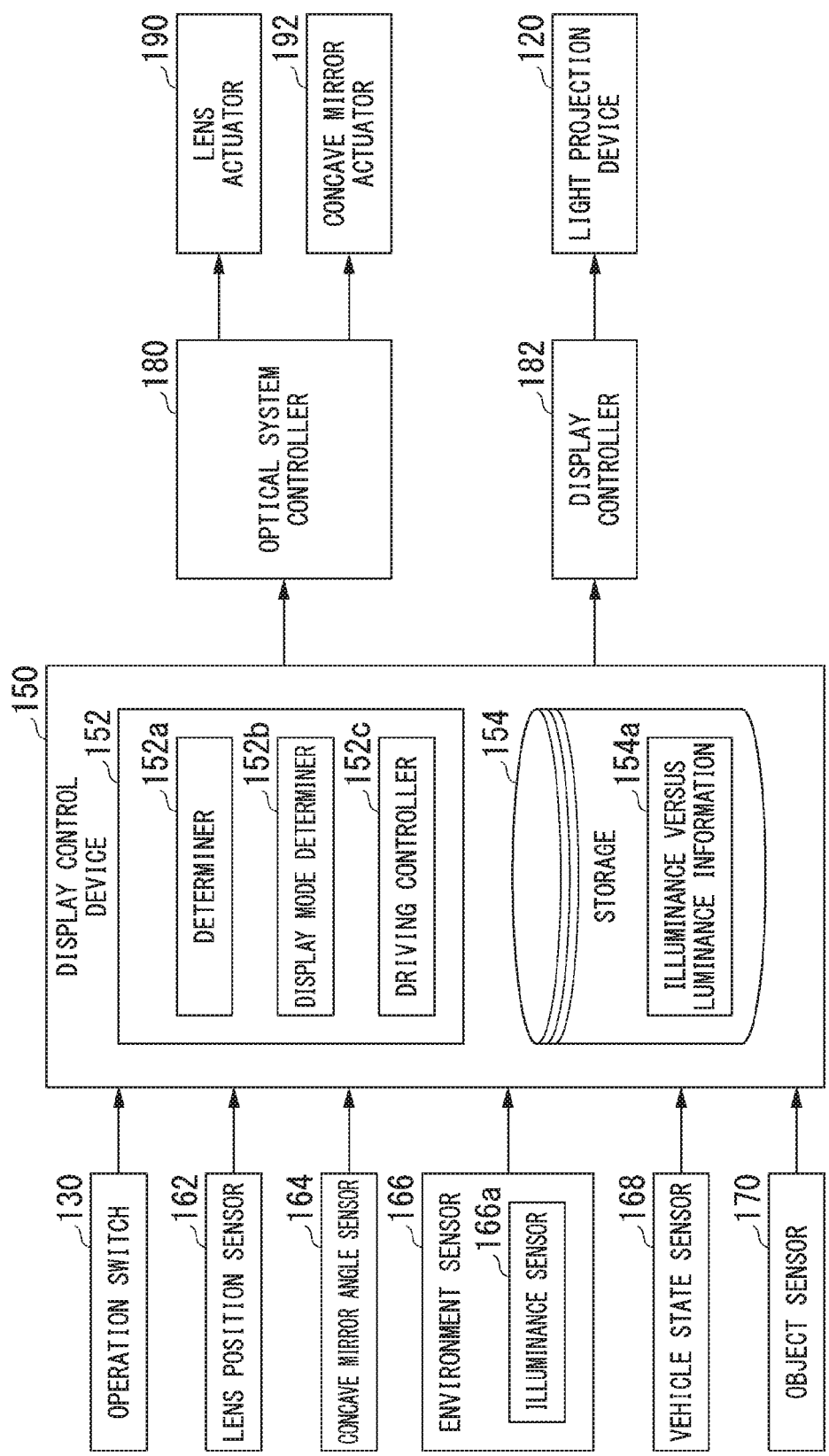
FIG. 5 is a diagram showing a configuration example of a display device centering on a display control device.

The display control device 150 controls the display of the virtual image VI visually recognized by the driver. FIG. 5 is a diagram showing a configuration example of the display device 100 centering on the display control device 150. The display device 100 includes a lens position sensor 162, a concave mirror angle sensor 164, an environment sensor 166, a vehicle state sensor 168, an object sensor 170, an optical system controller 180, a display controller 182, a lens actuator 190, and a concave mirror actuator 192 in addition to the light projection device 120, the operation switch 130, and the display control device 150. The lens actuator 190 is an example of a "first actuator," and the concave mirror actuator 192 is an example of a "second actuator."

The lens position sensor 162 detects the position of each lens included in the optical mechanism 122 and outputs a signal indicating a detection result to the display control device 150. The concave mirror angle sensor 164 detects a rotation angle around the rotation axis (Y axis) of the concave mirror 126 and outputs a signal indicating a detection result to the display control device 150.

The environment sensor 166 includes, for example, an illuminance sensor 166a. The illuminance sensor 166a detects an illuminance LM (the degree of brightness) inside or outside the vehicle and outputs a signal indicating a detection result to the display control device 150.

The vehicle state sensor 168 detects, for example, the speed of the vehicle M, detects an acceleration, detects an angular velocity (yaw rate) around the vertical axis, and detects the direction of the vehicle M. The vehicle state sensor 168 outputs signals indicating detection results to the display control device 150.

The object sensor 170 includes, for example, a camera, a radar, a light detection and ranging (LIDAR), and the like and detects an object which is present in the vicinity of the vehicle M. For example, the object sensor 170 detects, for example, a four-wheeled vehicle, a motorcycle, a bicycle, a pedestrian, a utility pole, a guardrail, an object that has fallen on a road, a road sign, a road mark, a lane mark, and the like. The object sensor 170 outputs signals indicating detection results to the display control device 150.

The display control device 150 includes, for example, a controller 152 and a storage 154. The controller 152 includes, for example, a determiner 152a, a display mode determiner 152b, and a driving controller 152c. Components of the controller 152 are realized by causing a processor such as a central processing unit (CPU) or a graphics-processing unit (GPU) to execute a program (software). In addition, some or all of these components may be realized by hardware (a circuit unit; circuitry is included) such as a large-scale integration (LSI), an application-specific integrated circuit (ASIC), or a field-programmable gate array (FPGA), or may be realized by software and hardware in cooperation. The program referred to by the processor program may be stored in advance in the storage 154 of the display control device 150, or may be stored in a detachable storage medium such as a DVD or a CD-ROM and may be installed in the storage 154 by the storage medium being mounted in a drive device of the display control device 150.

The storage 154 is realized by, for example, an HDD, a flash memory, an electrically-erasable programmable read-only memory (EEPROM), a read-only memory (ROM), a random-access memory (RAM), or the like. A non-transitory storage medium such as an HDD or a flash memory included in the in the storage 154 may be realized by another storage device connected thereto through a network (for example, a wide area network) such as a network attached storage (NAS) or an external storage server device. The storage 154 stores, for example, illuminance versus luminance information 154a in addition to the program read and executed by the processor. This will be described later.

The determiner 152a determines whether it is daytime or nighttime with reference to a signal indicating a detection result output by the illuminance sensor 166a. For example, the determiner 152a determines whether or not an illuminance LM (for example, in units of [1x] or [1 m/m$^2$]) detected by the illuminance sensor 166a is equal to or greater than a certain threshold value (hereinafter referred to as an illuminance threshold value LM$_{TH}$). In a case where the illuminance LM is equal to or greater than the illuminance threshold value LM$_{TH}$, it is determined that it is daytime, and in a case where the illuminance LM is less than the illuminance threshold value LM$_{TH}$, it is determined that it is nighttime. Meanwhile, the actual time does not need to be a time equivalent to daytime at a timing when the illuminance LM is equal to or greater than the illuminance threshold value LM$_{TH}$, and it may be determined that it is daytime when the vicinity of the vehicle M has a brightness regarded as being daytime. This is the same for nighttime. That is, the determiner 152a determines whether the vicinity of the vehicle M is bright enough to be regarded as being daytime or is dark enough to be regarded as being nighttime, on the basis of a detection result output by the illuminance sensor 166a.

The display mode determiner 152b determines a display mode of the virtual image VI visually recognized by the driver by determining image light IL to be projected by the light projection device 120 on the basis of a detection result of the determiner 152a. For example, the display mode determiner 152b determines image light IL to be projected by the light projection device 120 to be image light for daytime (hereinafter referred to as first image light ILa) in a case where the determiner 152a determines that it is daytime, and determines image light IL to be projected by the light projection device 120 to be image light for nighttime (hereinafter referred to as second image light ILb) in a case where the determiner 152a determines that it is nighttime. An image included in the first image light ILa is an example of a "first image," and an image included in the second image light ILb is an example of a "second image."

The driving controller 152c generates control signals on the basis of a detection result of the vehicle state sensor 168, a detection result of the object sensor 170, and the like, and outputs the generated control signals to the optical system controller 180. The control signals include a first control signal and a second control signal. The first control signal is, for example, a control signal for changing the current virtual image visible distance D from the line-of-sight position P1 of the driver to the virtual image VI to a target virtual image visible distance (hereinafter referred to as a target virtual image visible distance $D_{TA}$). The second control signal is, for example, a control signal for changing the current depression angle θ to a target depression angle (hereinafter referred to as a target depression angle $θ_{TA}$).

As described above, the virtual image visible distance D is an optical distance from the line-of-sight position P1 of the driver to the formation position P2 where image light IL is formed as a virtual image VI. The virtual image visible distance D is a distance obtaining by adding a first distance Da and a second distance Db. As shown in FIG. 3, the first distance Da is a distance from a reflection point of image light IL of the front windshield 20 to the line-of-sight position P1 of the driver in a focal distance until the image light IL reflected by the concave mirror 126 is reflected by the front windshield 20 and is condensed at the line-of-sight position P1 of the driver. In addition, as shown in FIG. 3, the second distance Db is a distance between a reflection point of the image light IL from the front windshield 20 and the formation position P2 of the virtual image VI. The current virtual image visible distance D is determined on the basis of the position of a lens which is detected by the lens position sensor 162.

As shown in FIG. 3, the depression angle θ is an angle formed by a horizontal direction (X direction) passing through the line-of-sight position P1 of the driver and a line-of-sight direction of the driver when the virtual image VI is visually recognized by the driver. In other words, the depression angle θ is defined as an angle formed by a horizontal surface passing through the line-of-sight position P1 of the driver and a segment from the line-of-sight position P1 of the driver to the formation position P2 of the virtual image VI. As the virtual image VI is formed further downward, that is, as the line-of-sight direction of the driver faces further downward, the depression angle θ increases. The current depression angle θ is determined on the basis of a reflection angle φ of the concave mirror 126 which is detected by the concave mirror angle sensor 164. As shown in FIG. 3, the reflection angle φ is an angle formed by an incidence direction when the image light IL reflected by the plane mirror 124 is incident on the concave mirror 126 and a reflection direction when the concave mirror 126 reflects the image light IL.

For example, the driving controller 152c determines the target virtual image visible distance $D_{TA}$ and the target depression angle $θ_{TA}$ on the basis of the speed of the vehicle M which is detected by the vehicle state sensor 168.

In general, the driver tends to visually recognize a space outside the vehicle which is close to the vehicle M in a situation where the speed of the vehicle M decreases and to visually recognize a space outside the vehicle which is far from the vehicle M in a situation where the speed of the vehicle M increases. That is, the driver can easily visually recognize a lower side of the displayable region A1 in a situation where the speed of the vehicle M decreases, and can easily visually recognize an upper side of the displayable region A1 in a situation where the speed of the vehicle M increases.

Therefore, the driving controller 152c may increase the target virtual image visible distance $D_{TA}$ as the speed of the vehicle M increases, and may decrease the target virtual image visible distance $D_{TA}$ as the speed of the vehicle M decreases. In addition, the driving controller 152c may determine a minimum distance determined in advance to be the target virtual image visible distance $D_{TA}$ in a case where the speed of the vehicle M is zero or a speed regarded as being a stopped state.

In addition, the driving controller 152c decreases the target depression angle $θ_{TA}$ as the speed of the vehicle M increases, and increases the target depression angle $θ_{TA}$ as the speed of the vehicle M decreases. In this manner, the target virtual image visible distance $D_{TA}$ and the target depression angle $θ_{TA}$ are changed in accordance with the speed of the vehicle M, so that it is possible to display the virtual image VI at the tip of the driver's line of sight even when the direction of viewing of the driver is changed in accordance with the speed of the vehicle M.

In addition, the driving controller 152c may determine the target virtual image visible distance $D_{TA}$ and the target depression angle $θ_{TA}$ on the basis of a relative positional relationship between a preceding vehicle (also referred to as a leading vehicle) detected by the object sensor 170 and the vehicle M, instead of or in addition to determining the target virtual image visible distance $D_{TA}$ and the target depression angle $θ_{TA}$ in accordance with the speed of the vehicle M.

In general, a rear bumper, a license plate, a display lamp, a rear window shield, and the like are provided on the rear surface of the preceding vehicle. Accordingly, in a case where the rear surface of the preceding vehicle is captured as one scene image, textures included in the scene image tend to be non-uniform or uneven. In a case where the virtual image VI is superimposed on the rear surface of the preceding vehicle in which such various textures are mixed, it may be difficult to visually recognize the content of the virtual image VI.

Therefore, the driving controller 152c determines an angle such that a virtual image VI is superimposed on the rear surface of a preceding vehicle having complex textures to be the target depression angle $θ_{TA}$. More specifically, in a case where an inter-vehicle distance (relative distance) between a preceding vehicle and the vehicle M is less than a predetermined distance, the driving controller 152c determines the target depression angle $θ_{TA}$ so that a virtual image VI is superimposed on a scene image for which textures are assumed to be uniform or even (for example, a road surface between the preceding vehicle and the vehicle M). Thereby, the virtual image VI is displayed at a position where the virtual image is not superimposed on the rear surface of the preceding vehicle. As a result, the driver can easily visually recognize the content of the virtual image VI.

In addition, the driving controller 152c may determine the target virtual image visible distance $D_{TA}$ and the target depression angle $θ_{TA}$ in accordance with a relative speed between the preceding vehicle and the vehicle M, a time to collision (TTC) obtained by dividing a relative distance between the preceding vehicle and the vehicle M by the relative speed between the preceding vehicle and the vehicle M, and the like.

In addition, the driving controller 152c may output a third control signal for changing the size of an image to the display controller 182 at the time of changing the target virtual image visible distance $D_{TA}$.

The virtual image VI is an image obtained by enlarging or reducing an image displayed on the display element 120B in accordance with the target virtual image visible distance $D_{TA}$. In a case where the target virtual image visible distance $D_{TA}$ is set to be variable, the driver can visually recognize the virtual images VI having different sizes even when the sizes of images (display regions) displayed on the display element 120B are the same. For this reason, the driving controller 152c outputs a third control signal for displaying an image having a size depending on the target virtual image visible distance $D_{TA}$ on the display element 120B to the display controller 182 in order to keep the size of the virtual image VI visually recognized by the driver constant even when the target virtual image visible distance $D_{TA}$ is changed.

In addition, the driving controller 152c may further generate a control signal on the basis of the driver's operation with respect to the operation switch 130 in addition to generating a control signal on the basis of a detection result of the vehicle state sensor 168, a detection result of the object sensor 170, and the like.

For example, in a case where the first adjustment switch 134 is operated, the driving controller 152c derives an angle designated by the driver on the basis of the amount of operation (the number of operations or an operation time) of the first adjustment switch 134 in order to move the position of the virtual image VI upward within the displayable region A1, and determines an angle obtained by subtracting the derived angle (the angle designated by the driver) from the current depression angle θ to be the target depression angle $θ_{TA}$. For example, when the driver operates the first adjustment switch 134 three times in a case where an angle is adjusted twice through one operation with respect to the first adjustment switch 134, the driving controller 152c determines the target depression angle $θ_{TA}$ to be an angle of the current depression angle θ minus 6 degrees.

Further, for example, in a case where the second adjustment switch 136 is operated, the driving controller 152c derives an angle designated by the driver on the basis of the amount of operation (the number of operations or an operation time) of the second adjustment switch 136 in order to move the position of the virtual image VI downward within the displayable region A1, and determines an angle obtained by adding the derived angle (the angle designated by the driver) to the current depression angle θ to be the target depression angle $θ_{TA}$. For example, when the driver operates the second adjustment switch 136 four times in a case where an angle is adjusted twice through one operation with respect to the second adjustment switch 136, the driving controller 152c determines the target depression angle $θ_{TA}$ to be an angle of the current depression angle θ plus 8 degrees.

In this manner, when the target virtual image visible distance $D_{TA}$ and the target depression angle $θ_{TA}$ are determined on the basis of a detection result of the vehicle state sensor 168, a detection result of the object sensor 170, and the driver's operation with respect to the operation switch 130, the driving controller 152c outputs control signals indicating those index values to the optical system controller 180.

The optical system controller 180 drives the lens actuator 190 on the basis of a first control signal included in the control signals output by the driving controller 152c. The lens actuator 190 includes a motor and the like and moves the positions of the lenses included in the optical mechanism 122 in the optical axis direction to adjust the virtual image visible distance D.

For example, in a case where the first control signal indicates a target virtual image visible distance $D_{TA}$ shorter than the current virtual image visible distance D, the optical system controller 180 drives the lens actuator 190 to bring the positions of the lenses close to the plane mirror 124 side in the optical axis direction. Thereby, the second distance Db is reduced, and the virtual image visible distance D is reduced. As a result, the virtual image VI is visually recognized as farther when viewed by the driver.

Further, in a case where the first control signal indicates a target virtual image visible distance $D_{TA}$ longer than the current virtual image visible distance D, the optical system controller 180 drives the lens actuator 190 to bring the positions of the lenses close to the display element 120B side in the optical axis direction. Thereby, the second distance Db is increased, and the virtual image visible distance D is increased. As a result, the virtual image VI is visually recognized as closer when viewed by the driver.

In addition, the optical system controller 180 drives the concave mirror actuator 192 on the basis of a second control signal included in the control signals output by the driving controller 152c. The concave mirror actuator 192 includes a motor and the like and rotates the concave mirror 126 around the rotation axis (Y axis) to adjust the reflection angle φ of the concave mirror 126.

For example, in a case where the second control signal indicates a target depression angle $θ_{TA}$ smaller than the current depression angle θ, the optical system controller 180 drives the concave mirror actuator 192 to decrease the reflection angle φ of the concave mirror 126. As shown in FIG. 3, image light IL reflected by the concave mirror 126 is incident on the front windshield 20 inclined in the horizontal direction (X direction) from below, and thus the image light IL is incident on a higher end side (an upper side in the Z direction) of the front windshield 20 in a case where the reflection angle φ of the concave mirror 126 becomes smaller. In this case, a reflection point of the image light IL in the front windshield 20 is moved to the higher end side (the upper side in the Z direction) of the front windshield 20. As a result, the virtual image VI formed on an extension line of a line connecting the line-of-sight position P1 of the driver and the reflection point moves upward within the displayable region A1.

Further, for example, in a case where the second control signal indicates a target depression angle $θ_{TA}$ larger than the current depression angle θ, the optical system controller 180 drives the concave mirror actuator 192 to increase the reflection angle φ of the concave mirror 126. Thereby, a reflection point of the image light IL in the front windshield 20 is moved to a lower end side (a lower side in the Z direction) of the front windshield 20. As a result, the virtual image VI formed on an extension line of a line connecting the line-of-sight position P1 of the driver and the reflection point moves downward within the displayable region A1.

The display controller 182 causes the image light IL determined by the display mode determiner 152b to be output to the light projection device 120. In addition, the display controller 182 causes the display element 120B of the light projection device 120 to change the size of an image on the basis of the third control signal output by the driving controller 152c. For example, the display controller 182 changes the size of an image by causing the display element 120B to change the resolution of the image. Thereby, a relative size of the virtual image VI with respect to the displayable region A1 is changed.

Figure 6:
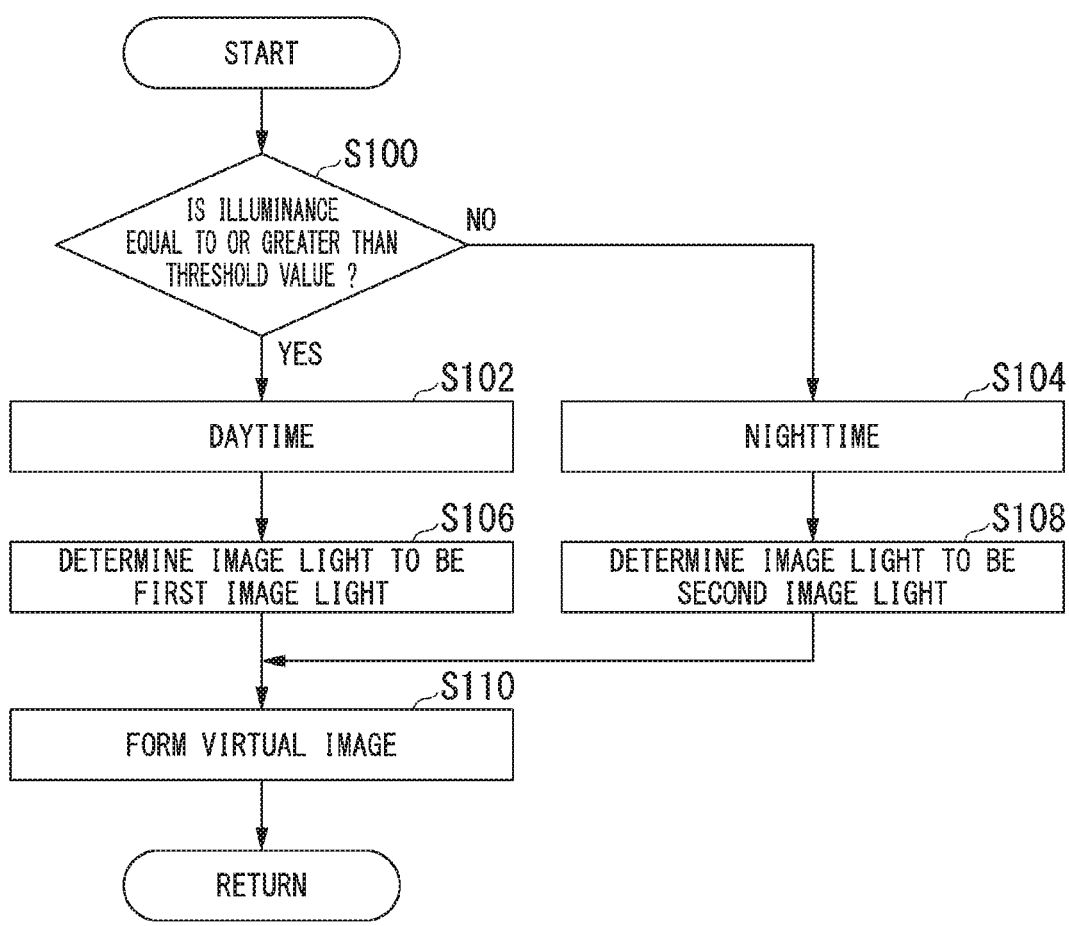
FIG. 6 is a flowchart showing an example of a series of processes of the display control device.

Hereinafter, a series of processes of the display control device 150 will be described using a flowchart. FIG. 6 is a flowchart showing an example of a series of processes of the display control device 150. For example, the processes in the flowchart may be repeatedly performed at predetermined cycles.

First, the determiner 152a determines whether or not an illuminance LM detected by the illuminance sensor 166a is equal to or greater than an illuminance threshold value $LM_{TH}$ (step S100).

The determiner 152a determines that it is daytime in a case where the illuminance LM is equal to or greater than the illuminance threshold value $LM_{TH}$ (step S102), and determines that it is nighttime in a case where the illuminance LM is less than the illuminance threshold value $LM_{TH}$ (step S104).

The display mode determiner 152b determines image light IL projected by the light projection device 120 to be first image light ILa in a case where the determiner 152a determines that it is daytime (step S106), and determines image light IL projected by the light projection device 120 to be second image light ILb in a case where the determiner 152a determines that it is nighttime (step S108). In addition, the display controller 182 forms a virtual image VI by causing the light projection device 120 to output the image light IL determined by the display mode determiner 152b (step S110).

For example, the display mode determiner 152b determines a display mode of each of the virtual image VI corresponding to the first image light ILa and the virtual image VI corresponding to the second image light ILb with reference to the illuminance versus luminance information 154a.

Figure 7:
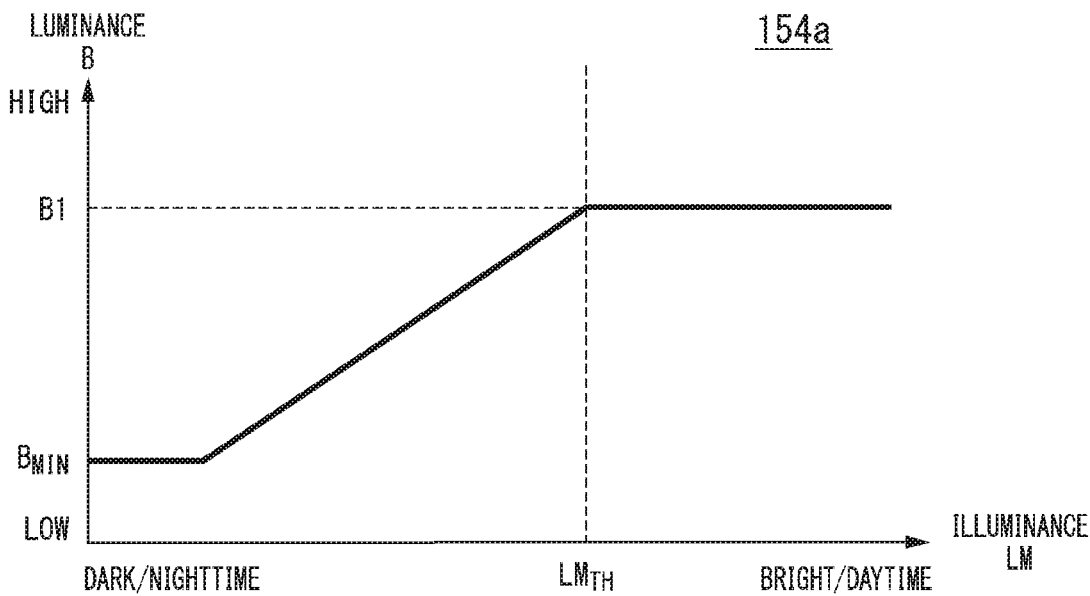
FIG. 7 is a diagram showing an example of illuminance versus luminance information.

FIG. 7 is a diagram showing an example of the illuminance versus luminance information 154a. In the drawing, the horizontal axis represents an illuminance LM, and the vertical axis represents a luminance B of image light IL, that is, a luminance of a virtual image VI. The illuminance versus luminance information 154a is information in which the luminance B of the virtual image VI easily visually recognized by the driver or a luminance of the image light IL with which the virtual image VI can be formed is associated with the illuminance LM.

For example, the display mode determiner 152b changes the luminance of the first image light ILa to a certain luminance B1 in the daytime when the illuminance LM is equal to or greater than the illuminance threshold value LW)). In addition, the display mode determiner 152b changes the luminance of the second image light ILb to a luminance equal to or less than the luminance B1 in the nighttime when the illuminance LM is less than the illuminance threshold value $LM_{TH}$. In this case, the display mode determiner 152b decreases the luminance of the second image light ILb in association with a decrease in the illuminance LM in a range equal to or greater than a minimum luminance $B_{MIN}$. For example, the minimum luminance $B_{MIN}$ may be set to the lowest luminance at which the driver can visually recognize the virtual image VI when the luminance of the virtual image VI is reduced in the nighttime. In this manner, the virtual image VI is made relatively bright to improve visibility because the surroundings of the vehicle M are bright in the daytime, and the virtual image VI is made relatively dark to such an extent that the driver can visually recognize the virtual image because the surroundings of the vehicle M are dark in the nighttime.

In a case where the luminance of image light IL output by the light projection device 120 is increased, the luminance of the first virtual image $VI_1$ formed by the first image light ILa reflected by the front surface 20-1 of the front windshield 20 is increased accordingly, and the luminance of the second virtual image $VI_2$ formed by the first image light ILa reflected by the rear surface 20-2 of the front windshield 20 is increased. Thereby, a double image is likely to be more clearly visually recognized by the driver.

In a case where the luminance of the image light IL is increased in this manner, a double image is more easily visually recognized, and thus the display mode determiner 152b changes an image included in the first image light ILa to an image making it difficult for the driver to perceive (feel) that a double image is generated (hereinafter, referred to as a double-image curbed image) when the first image light ILa is output by the light projection device 120.

Figure 8:
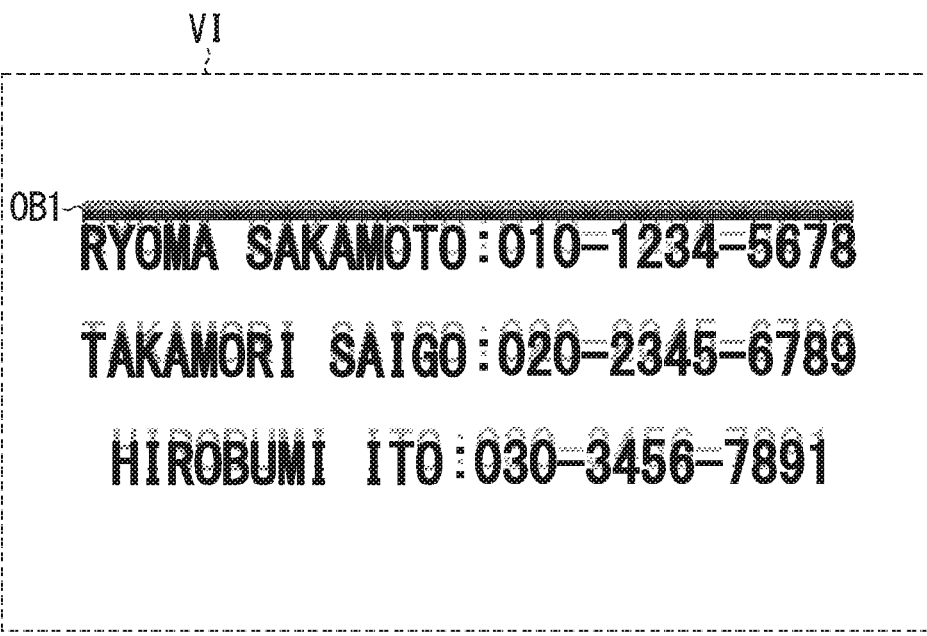
FIG. 8 is a diagram showing an example of a virtual image formed when first image light including a double-image curbed image is output.

FIG. 8 is a diagram showing an example of a virtual image VI formed when the first image light ILa including a double-image curbed image is output. For example, in a case where names of persons (in the example shown in the drawing, names of famous Japanese men, such as "Ryoma Sakamoto", "Takamori Saigo", and "Hirobumi Ito", are shown) and content such as phone numbers which are contact information of the persons are included in an image as characters and signs, the display mode determiner 152b disposes an object (image element) OB which is not related to the content above the content. For example, in a case where the driver operates the operation switch 130 or the like to select the person "Ryoma Sakamoto" listed up on the uppermost side from among the three persons as a counterpart the driver desires to call, the display mode determiner 152b disposes a line-shaped object OB1 having a certain width above characters indicating the name and the phone number of the person "Ryoma Sakamoto" selected as a counterpart the driver desires to call as in the example shown in the drawing. Thereby, in a case where a double image is generated in content, a second virtual image $VI_2$ (a virtual image having a lower luminance) of the name and the phone number of the person and the object OB1 overlap each other, and thus only the first virtual image $VI_1$ can be easily visually recognized, and blurring of the content (the name and the phone number of the person) is curbed.

In addition, the display mode determiner 152b may display the object OB1 disposed above the content in a color which easily blends into a background.

Figure 9:
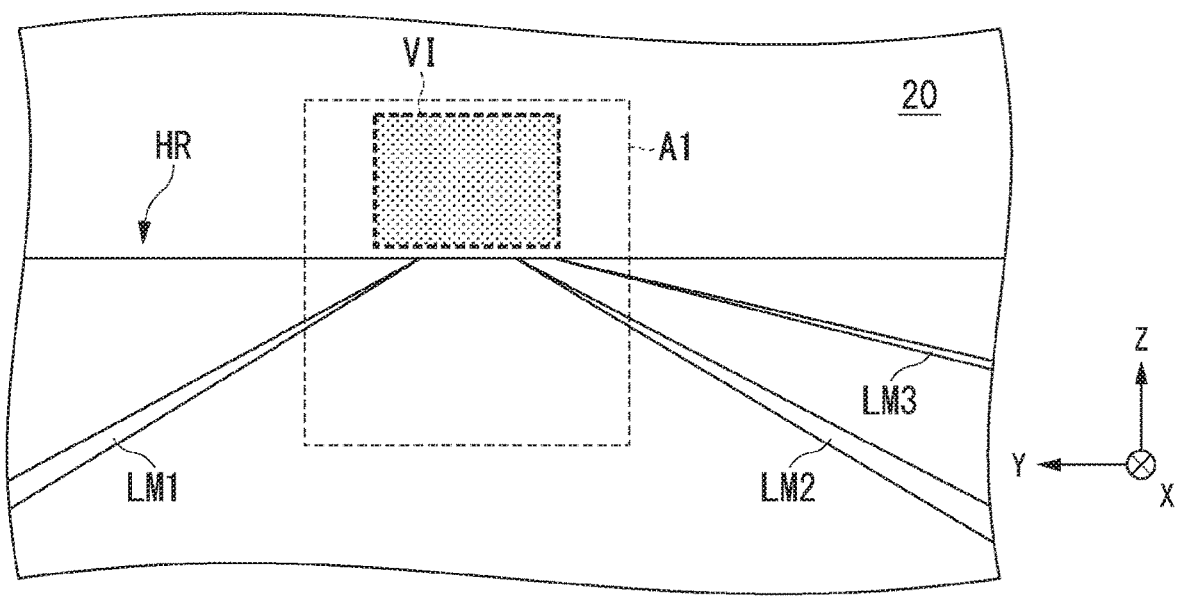
FIG. 9 is a diagram showing the color of an object.
Figure 10:
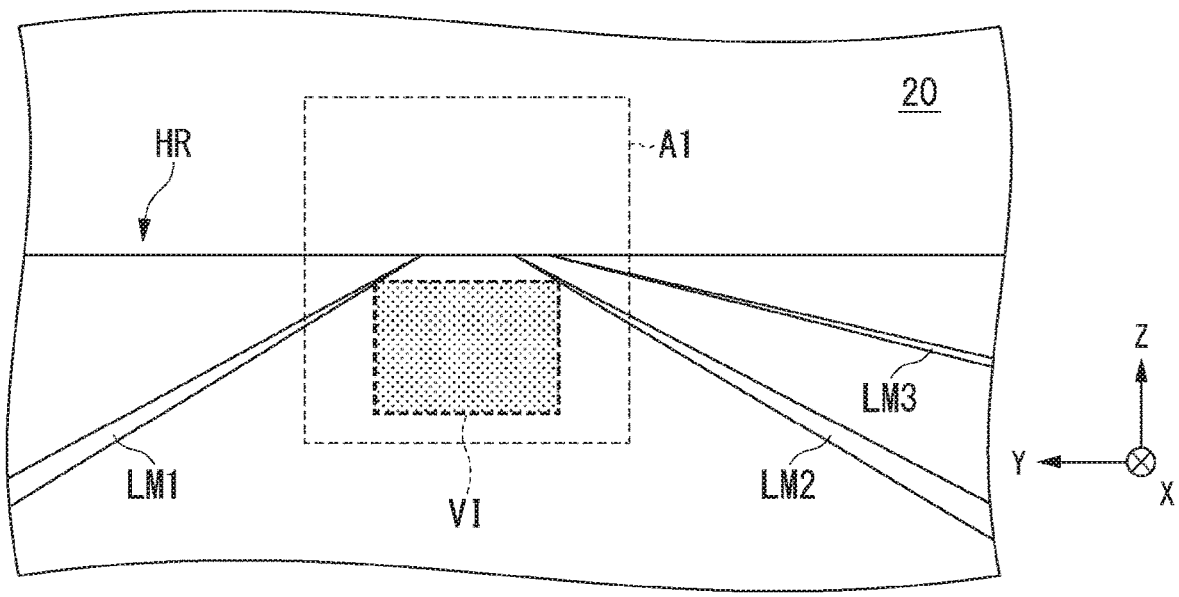
FIG. 10 is a diagram showing the color of an object.

FIGS. 9 and 10 are diagrams showing the color of the object OB. In the drawing, HR indicates a horizontal line when a scene in front of the vehicle M is viewed over the front windshield 20, and LM1 to LM3 indicate division lines drawn on a road. As shown in FIG. 9, for example, in a case where a display position of a virtual image VI in a displayable region A1 is a region above the horizontal line HR, the sky and the like serve as a background, and thus an object OB1 of a "blue color" close to the color of the sky is disposed above content. The "blue color" of the object OB1 may be a blue color of RGB (79,129,189) at the brightest point and may be a blue color of RGB (37, 72, 114) at the darkest point, for example, when a white color is set to be RGB (255, 255, 255). Further, as shown in FIG. 10, in a case where a display position of a virtual image VI in a displayable region A1 is a region below the horizontal line HR, a road surface and the like serve as a background, and thus an object OB1 of a color (for example, an asphalt color) close to the color of the road surface is disposed above content. The object OB1 having a color close to a background color is displayed in this manner, and thus the color of the second virtual image $VI_2$ of the object OB1 becomes closer to the color of the background even when a double image is formed in the object OB1 itself, thereby making it difficult for the object OB1 to be visually recognized as a double image. As a result, it is possible to make it difficult for the driver to perceive a double image of content.

In addition, the display mode determiner 152b may use an image in which an object OB1 of which the edge is expressed by gradation is disposed above content as a double-image curbed image.

Figure 11:
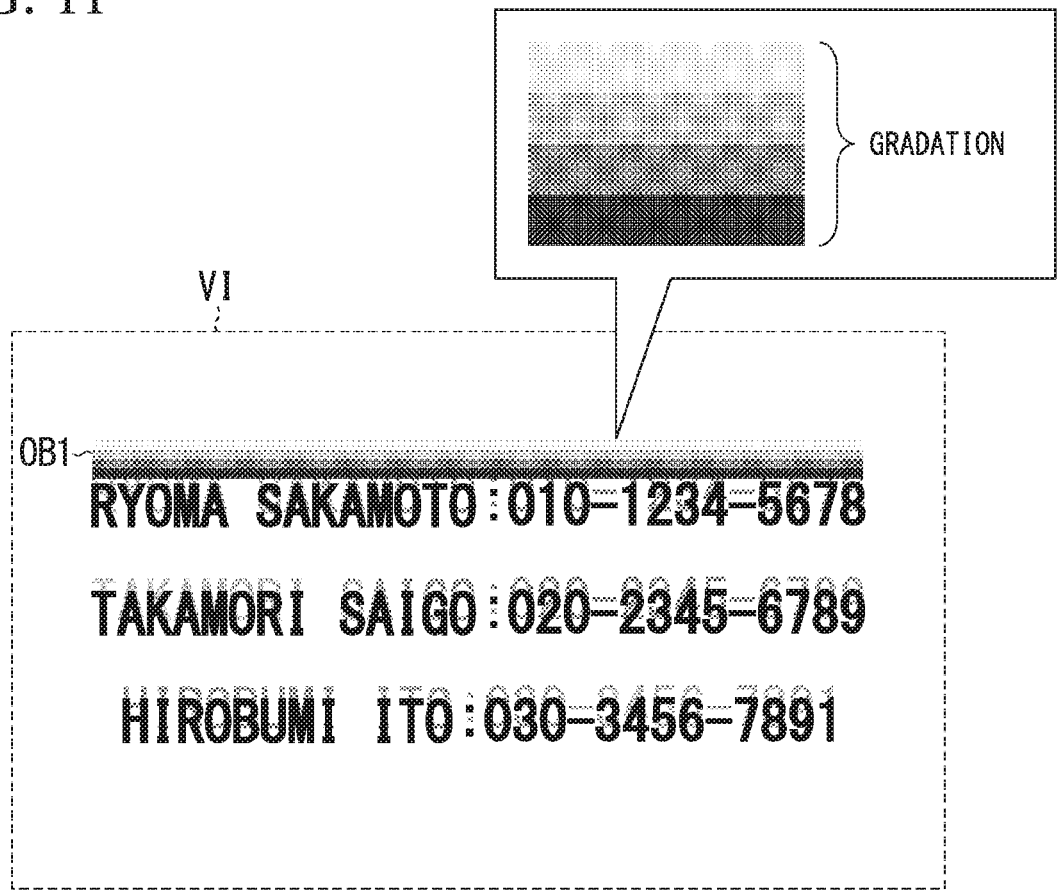
FIG. 11 is a diagram showing another example of a virtual image formed when first image light including a double-image curbed image is output.

FIG. 11 is a diagram showing another example of a virtual image VI formed when first image light ILa including a double-image curbed image is output. As shown in the drawing, for example, the display mode determiner 152b decreases a luminance from a lower side to an upper side in a stepwise manner in the width direction of an object OB1. In this manner, the luminance of a region closer to an edge (an end in the width direction of a line) in the region of the object OB1 is further reduced, and thus a second virtual image $VI_2$ of the object OB1 becomes closer to the color of a background (easily transmitted), and the object OB1 is hardly visually recognized as a double image. As a result, it is possible to make it difficult for the driver to perceive a double image of content.

In addition, the display mode determiner 152b may use an image having an object OB2 surrounding content as a double-image curbed image, instead of disposing the line-shaped object OB1 above content.

Figure 12:
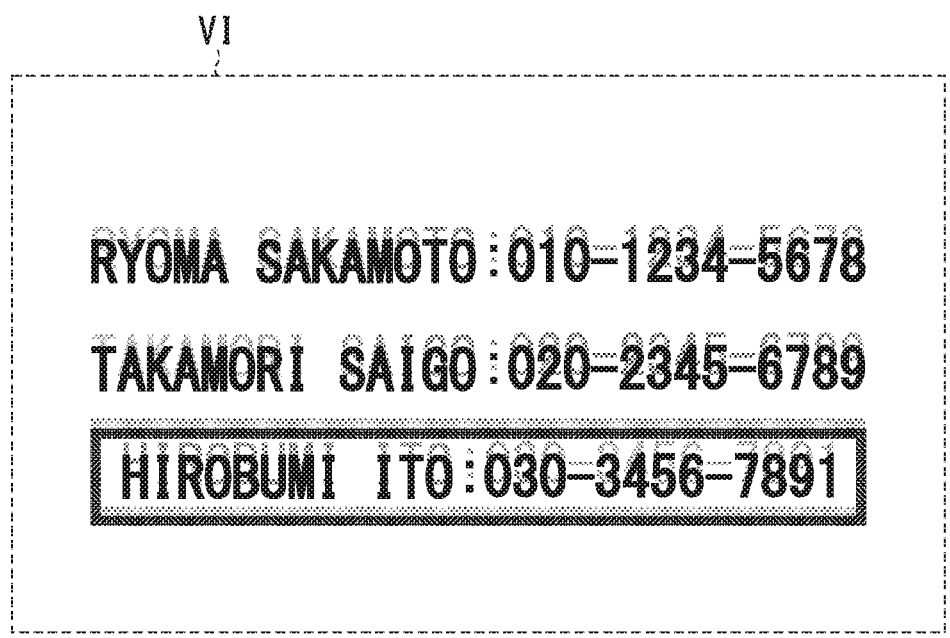
FIG. 12 is a diagram showing still another example of a virtual image formed when first image light including a double-image curbed image is output.

FIG. 12 is a diagram showing still another example of a virtual image VI formed when first image light ILa including a double-image curbed image is output. For example, in a case where the driver selects the person "Hirobumi Ito" as a counterpart the driver desires to call, the display mode determiner 152b disposes an object OB2 surrounding characters indicating the name and the phone number of the person "Hirobumi Ito" selected as a counterpart the driver desires to call as in the example shown in the drawing. Thereby, blurring of the content is curbed.

Further, as described above, in a case where the luminance of image light IL is increased in a case of daytime and the luminance of image light IL is decreased in a case of nighttime, the display mode determiner 152b may make the number of content of an image of second image light ILb to be output by the light projection device 120 in the nighttime larger than the number of content of an image of first image light ILa to be output by the light projection device 120 in the daytime.

Figure 13:
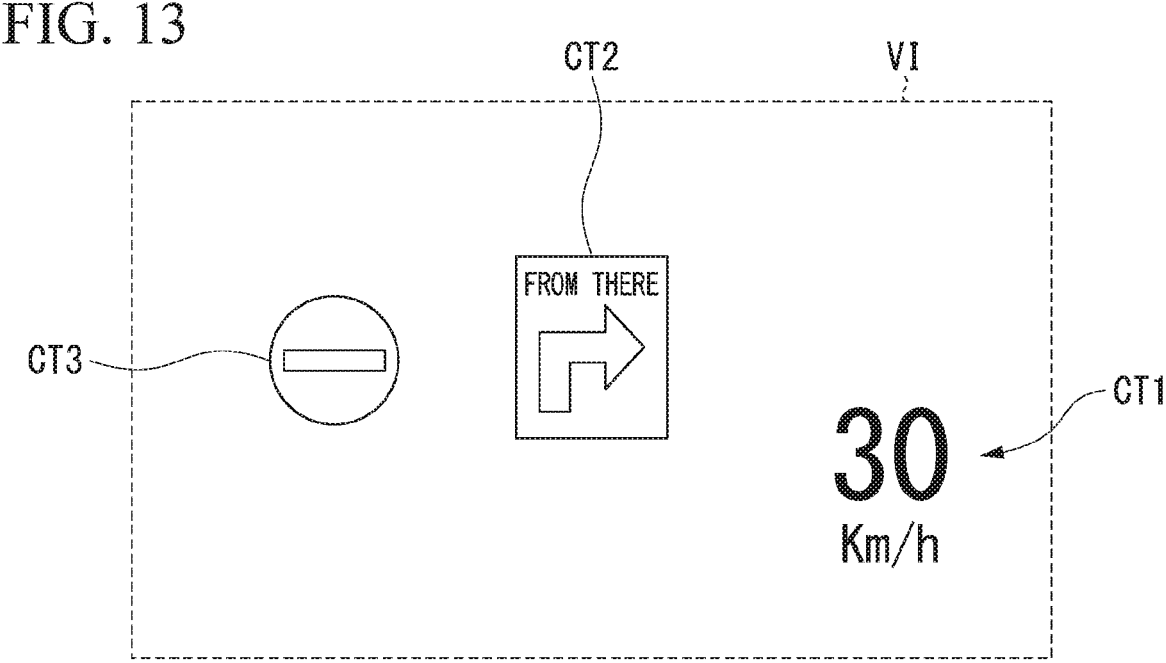
FIG. 13 is a diagram showing still another example of a virtual image formed when first image light is output.
Figure 14:
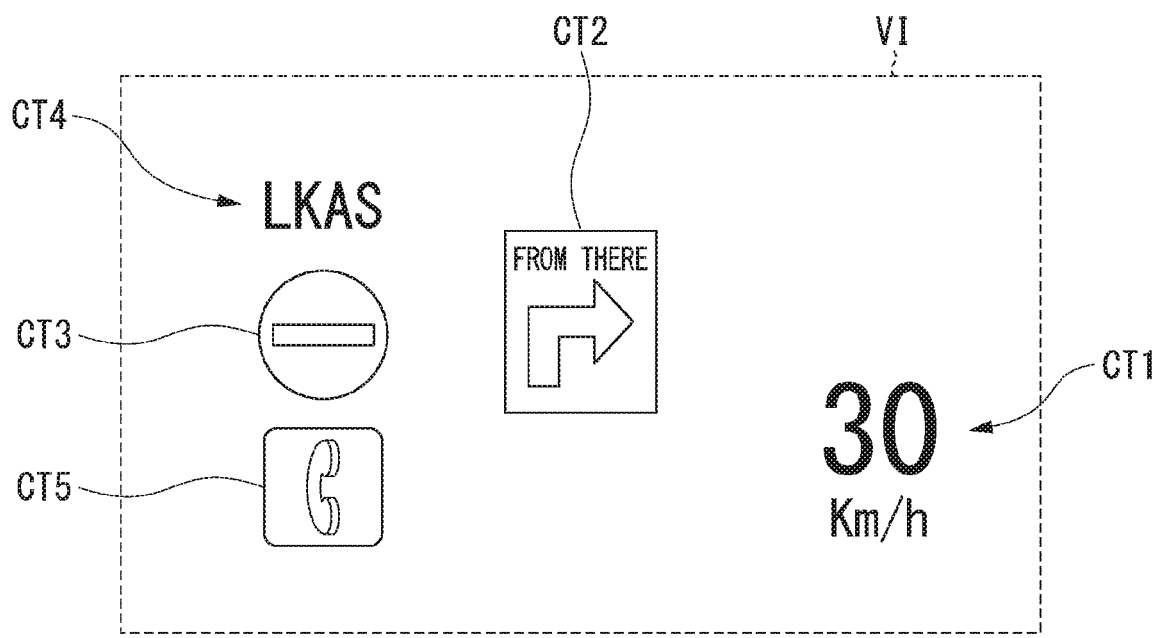
FIG. 14 is a diagram showing an example of a virtual image formed when second image light is output.

FIG. 13 is a diagram showing still another example of a virtual image VI formed when first image light ILa is output. In addition, FIG. 14 is a diagram showing an example of a virtual image VI formed when second image light ILb is output. In general, since a scene over the front windshield 20 in the nighttime is darker than that in the daytime, a virtual image VI is likely to be more clearly visually recognized. On the other hand, in the present embodiment, since the luminance of image light IL is reduced in the nighttime, the luminance of a second virtual image $VI_2$ which is a blurred portion of a double image is also relatively reduced. Therefore, as in the example shown in the drawing, the display mode determiner 152b may display content such as CT1, CT2, and CT3 as a virtual image VI in the daytime and may further display content such as CT4 and CT5 as a virtual image VI in the nighttime in addition to the content of CT1 to CT3. The content CT1 represents the speed of the vehicle M, the content CT2 represents a direction indication for indicating a direction in which the vehicle M should change the course, and the content CT3 represents a sign in front of the vehicle M. In addition, the content CT4 represents the type of driving support function being executed, and the content CT represents that there is an incoming call. In this manner, even when a relatively larger number of content are displayed in the daytime than in the nighttime, the content is hardly visually recognized by the driver as a double image, and thus it is possible to provide more information to the driver while improving the visibility of content.

According to the above-described embodiment, the light projection device 120 that projects image light IL onto the front windshield 20 reflecting incident light to make the driver visually recognize an image included in the image light IL as a virtual image VI, and the display control device 150 that causes the light projection device 120 to output first image light ILa in a case of daytime when an illuminance LM indicating a brightness surrounding the vehicle M is equal to or greater than an illuminance threshold value $LM_{TH}$ and causes the light projection device 120 to output second image light ILb in a case of nighttime when the illuminance LM is less than the illuminance threshold value $LM_{TH}$ are provided, and thus it is possible to make it difficult for the driver to visually recognize a double image. As a result, it is possible to improve the visibility of an image (virtual image VI).

Meanwhile, in the above-described embodiment, a description has been given on the assumption that the display device 100 makes image light IL incident on the front windshield 20 from below, but is not limited thereto. For example, the display device 100 may be provided on the roof of the vehicle M to make the image light IL incident on the front windshield 20 from above. In this case, a reflection point of the image light IL on the rear surface 20-2 of the front windshield 20 is positioned below a reflection point of the image light IL on the front surface 20-1. In this case, a second virtual image $VI_2$ is formed at a position shifted downward with respect to a first virtual image $VI_1$.

In a case where image light IL is incident on the front windshield 20 from above, the display mode determiner 152b may use an image in which an object OB is disposed below content as a double-image curbed image. Thereby, even when image light IL is incident on the front windshield 20 from above, it is possible to make it more difficult for the driver to perceive a double image of content.

In addition, the display device 100 may project an image onto a combiner provided on the front side of the front windshield 20 when viewed from the driver, instead of directly projecting an image onto the front windshield 20. The combiner is a light-transmissive member and is, for example, a transparent plastic disc. The combiner is another example of a "reflector".

In addition, the display device 100 may project light onto a light-transmissive display device which is attached to the front or the surface of the front windshield 20 or inside the front windshield 20 instead of projecting light onto the front windshield 20. The light-transmissive display device includes, for example, a liquid crystal display, an organic EL display, or the like. In addition, the display device may project light onto a transparent member (for example, a visor, a spectacle lens, or the like) included in a device worn on a person's body.

In addition, a description has been given on the assumption that the display device 100 mentioned above is configured such that a virtual image visible distance D and a depression angle θ can be changed, but is not limited thereto. For example, the display device 100 may not include various actuators such as the lens actuator 190 and the concave mirror actuator 192 and various sensors such as the lens position sensor 162 and the concave mirror angle sensor 164. That is, the display device 100 in which a virtual image visible distance D and a depression angle θ are fixed may change a display mode of a virtual image VI to be visually recognized by the driver in the daytime and the nighttime by determining image light IL to be projected by the light projection device 120 to be first image light ILa in a case where the determiner 152*a* determines that it is daytime and determining image light IL to be projected by the light projection device 120 to be second image light ILb in a case where the determiner 152*a* determines that it is nighttime.

The above-described embodiment can be expressed as follows.

[Expression 1]

A display device is configured to include:

a light projection device which projects light including an image onto a reflector reflecting incident light to allow an observer to visually recognize the image included in the light reflected by the reflector as a virtual image;

a storage which stores a program; and a processor, wherein the processor executes the program to cause the light projection device to output first light including a first image in a first case where a surrounding brightness is equal to or greater than a threshold value and cause the light projection device to output second light including a second image in a second case where the surrounding brightness is less than the threshold value.

[Expression 2]

A display device is configured to include:

a head-up display; and a controller which displays a first image on the head-up display in a first case where a surrounding brightness is equal to or greater than a threshold value and displays a second image on the head-up display in a second case where the surrounding brightness is less than the threshold value.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A display device, comprising:

a light projection device which projects light including an image onto a reflector reflecting incident light to allow an observer to visually recognize the image included in the light reflected by the reflector as a virtual image; and a control device which causes the light projection device to output first light including a first image in a first case where a surrounding brightness is equal to or greater than a threshold value and causes the light projection device to output second light including a second image in a second case where the surrounding brightness is less than the threshold value, wherein the first image comprises content including characters or signs, and wherein the first image comprises a line-shaped object that overlaps a double-image of the content, wherein the control device causes the light projection device to output the first light including the first image in which the object in the color blue is disposed, and wherein the control device causes the light projection device to output the first light including the first image in which the object in the color blue is disposed to have a mixing ratio of the three primary colors in which red has a range of 37 to 79, green has a range of 72 to 129, and blue has a range of 114 to 189, in a case that a color white has the mixing ratio of red to green to blue of 255:255:255.

2. The display device according to claim 1, wherein the control device switches an image included in light to be output by the light projection device to the first image or the second image on the basis of a luminance of the image and a surrounding brightness.

3. The display device according to claim 1, wherein the control device causes the light projection device to output the second light including the second image having more content than the first image.

4. The display device according to claim 1, wherein the light projection device includes a display that emits light including an image, an optical mechanism which is provided on a path of the light and is configured to adjust an optical distance from a predetermined position to a position where the light is formed as a virtual image, a concave mirror which reflects light having passed through the optical mechanism toward the reflector, a first actuator which adjusts the optical distance, and a second actuator which adjusts a reflection angle of the concave mirror, and the control device changes the optical distance by controlling the first actuator and changes the reflection angle by controlling the second actuator.

5. The display device according to claim 4, wherein the optical mechanism includes one or more lenses, and the first actuator adjusts the optical distance by moving positions of the lenses in an optical axis direction of the light.

6. The display device according to claim 4, wherein the control device further changes a size of the image in accordance with the optical distance by controlling the display.

7. The display device according to claim 1, wherein content of the second image is different from the content of the first image.

8. The display device according to claim 1, wherein a luminance of the second light is lower than a luminance of the first light.

9. A display control method, comprising:

causing a computer to cause a light projection device to output first light including a first image in a first case where a surrounding brightness is equal to or greater than a threshold value and to cause the light projection device to output second light including a second image in a second case where the surrounding brightness is less than the threshold value, the computer including the light projection device which projects light including an image onto a reflector reflecting incident light to allow an observer to visually recognize the image included in the light reflected by the reflector as a virtual image, wherein the first image comprises content including characters or signs, and wherein the first image comprises a line-shaped object that overlaps a double-image of the content, causing the light projection device to output the first light including the first image in which the object in the color blue is disposed, and causing the light projection device to output the first light including the first image in which the object in the color blue is disposed to have a mixing ratio of the three primary colors in which red has a range of 37 to 79, green has a range of 72 to 129, and blue has a range of 114 to 189, in a case that a color white has the mixing ratio of red to green to blue of 255:255:255.

10. A computer-readable non-transitory storage medium storing a program for causing a computer to cause a light projection device to output first light including a first image in a first case where a surrounding brightness is equal to or greater than a threshold value and to cause the light projection device to output second light including a second image in a second case where the surrounding brightness is less than the threshold value, the computer including the light projection device which projects light including an image onto a reflector reflecting incident light to allow an observer to visually recognize the image included in the light reflected by the reflector as a virtual image,
- wherein the first image comprises content including characters or signs, and wherein the first image comprises a line-shaped object that overlaps a double-image of the content,
- cause the light projection device to output the first light including the first image in which the object in the color blue is disposed, and
- cause the light projection device to output the first light including the first image in which the object in the color blue is disposed to have a mixing ratio of the three primary colors in which red has a range of 37 to 79, green has a range of 72 to 129, and blue has a range of 114 to 189, in a case that a color white has the mixing ratio of red to green to blue of 255:255:255.

* * * * *